Patented Nov. 20, 1934

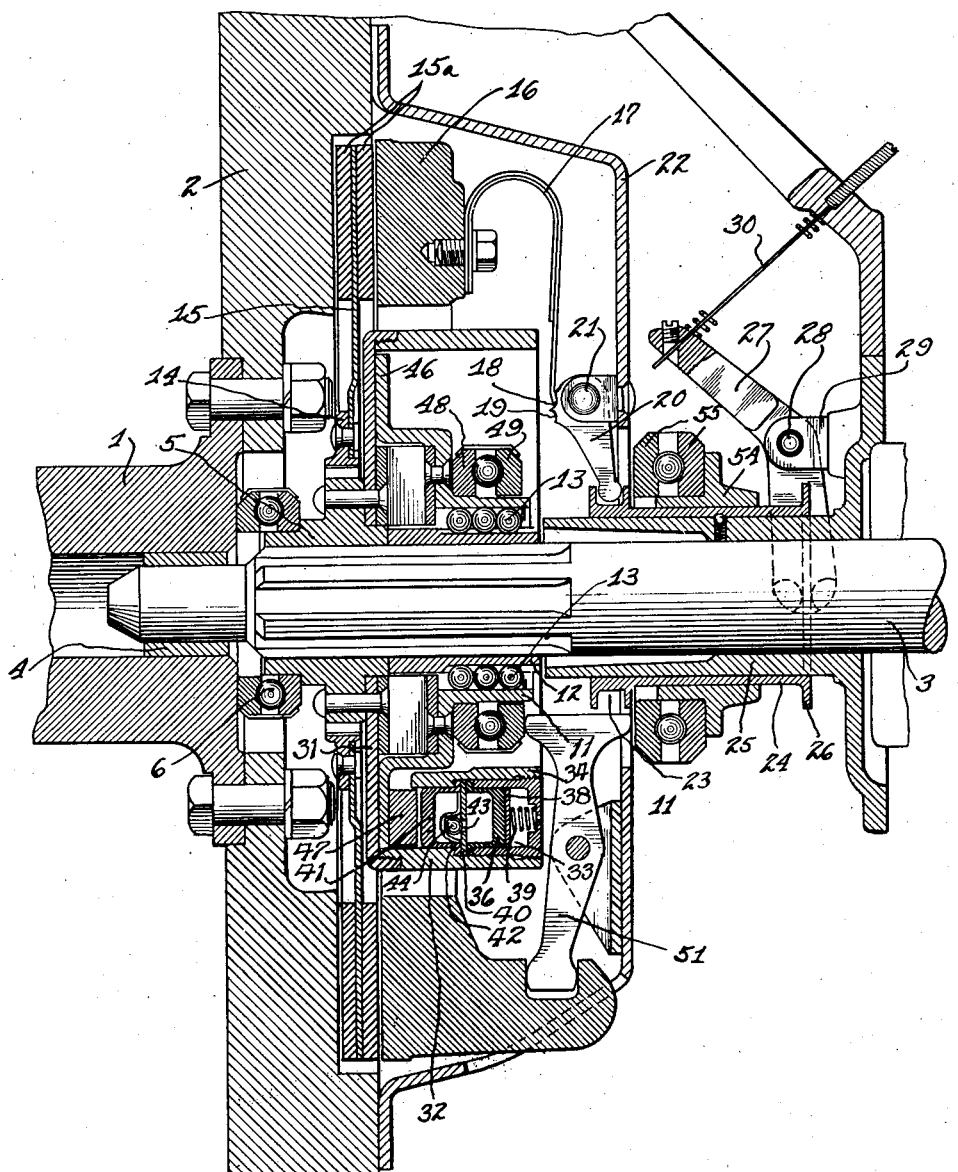

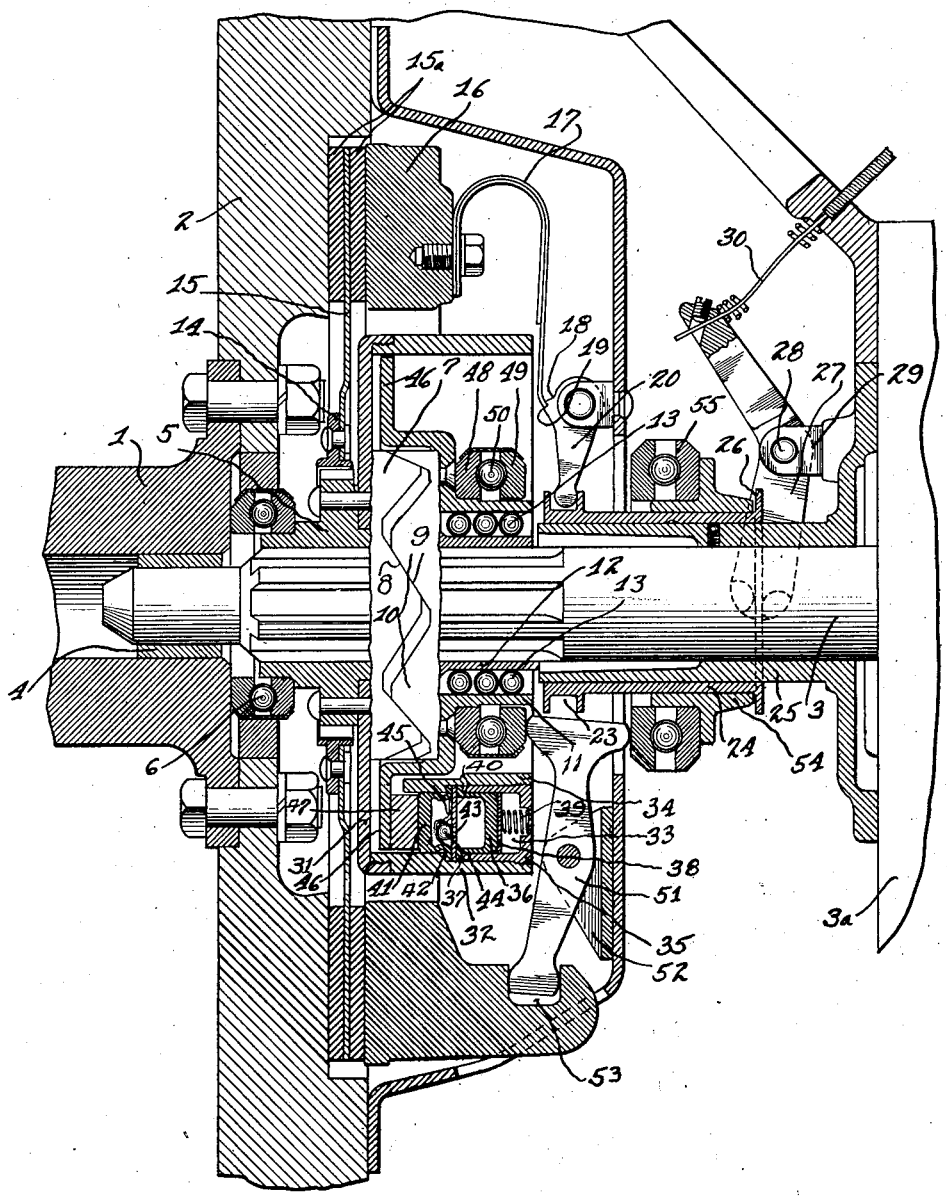

1,981,807

UNITED STATES PATENT OFFICE 1,981,807

FRICTION CLUTCH

Kenneth E. Lyman, Rockford, Ill.

Application November 25, 1932, Serial No. 644,230

8 Claims. (Cl. 192—68)

This invention relates to an automatic clutch and concerns itself with manually operable means for initially engaging the clutch and with novel yielding means for gradually increasing the friction of said clutch.

The invention comprises the novel structure and combination of parts hereinafter described and more particularly pointed out and defined in the appended claims.

In the accompanying drawings, which illustrate a preferred form of this invention and in which similar reference numerals refer to similar features in the different views:

Figure 1 is a sectional view through a clutch mechanism involving this invention and showing the clutching elements in disengaged position.

Figure 2 is a view similar to Figure 1 showing parts in different positions with the clutch elements initially engaged and under increased pressure.

In connection with this invention, there is illustrated a driving shaft 1 which may be the engine shaft of an automotive vehicle, that is usually equipped with a fly wheel 2. A driven element 3 is illustrated as a rotatable shaft journaled in a bearing 4 in the driving shaft 1 and extending into a transmission casing 3a.

Upon the driven shaft 3, there is loosely mounted a camming member 5 with a roller thrust bearing 6 interposed between such member and the driving member 1. The camming member 5 is provided upon its forward edge with cam projections 7 having inclined surfaces 8 which are adapted for engaging similar inclined surfaces 9 upon similar projections 10 extending from the rear edge of a cammed member 11 which is splined upon a bearing sleeve 12 by means of bearing balls 13. The bearing sleeve 12 is splined upon the driven shaft 3.

A ring 14 is splined upon the camming member 5 and this ring carries a friction clutch element 15 which comprises a friction plate 15x upon each side thereof. This friction element 15 is adapted to contact with the fly wheel 2. A friction plate or element 16 is adapted for engaging the friction element 15 in opposed relation to the fly wheel 2. This friction plate 16 has one or more bowed leaf springs 17 attached thereto. The free end of each bowed leaf spring 17 engages a notch 18 in a lever 20 which is pivoted as indicated at 21 to a lug on the casing 22 which is attached to the fly wheel. When the leaf spring is in engagement with the notch 18, the friction elements 15 and 16 are separated with the normal clearance therebetween which is shown somewhat exaggerated in the drawings. The lever 20 is provided with a second notch 19 for engaging the free end of the leaf spring when the clutch elements have been initially engaged. The lower end of the lever 20 fits in a groove 23 in a slidable sleeve 24 which surrounds the bearing 25 on the transmission casing that receives the shaft 3. The sleeve 24 terminates in a flange 26 to which is attached one end of an elbow shaped lever 27 which is pivoted intermediate its ends as indicated at 28 to a lug 29 extending from the transmission casing. A rod 30 which is connected to the upper end of the lever 27 may extend through the dash of the vehicle and be operated by the accelerator pedal.

When the friction clutch elements 15 and 16 are in their disengaged position, the leaf spring 17 will be in engagement with the notch 18 of the lever 20 as shown in Figure 1. When the accelerator pedal is actuated for actuating the lever 27 into the position shown in Figure 2, the sleeve 24 will be shifted to the left for partially rotating the lever 20 and engaging the leaf spring with the notch 19. This movement of the lever 20 will force the clutch elements 16 and 15 into initial engagement in connection with the fly wheel 2. The leaf spring 17 as it is forced to the left will snap from one recess 18 to the other recess 19.

A yielding connection is provided between the camming member 5 and the cammed member 11 which will now be set forth: A circular plate 31 is attached to the camming member 5 and a cylindrical casing 32 is attached to the plate 31. A plurality of cylinders (only one of which is shown) are formed within the casing 32. One of these cylinders is denoted by the reference numeral 33, and is preferably formed by casting the cylindrical casings 32 with arcuate walls 34 that merge with the outer wall of the casing. Each cylinder thuswise formed within the casing is closed at one end by a cap 35 which is threaded into the wall 34 and the casing 32. Within said cap is a resilient bag 36 which is preferably made of rubber and which conforms to the cylindrical surface of the cap. The free ends of this rubber bag are flanged over the inner end of the cap 35.

A metal disc 38 is preferably positioned against the bottom of the rubber bag 36 and a coil spring 39 is positioned between said disc 38 and the closed end of the cap 35 which may be provided with a suitable socket for centering said spring. A metal partition member in the form of a disc 40 is superposed over the flanged ends 37 of the rubber bag 36 and a second rubber bag 41 is positioned within said cylinder in opposed relation to the rubber bag 36. It will be noted that the cylinder is reduced at its inner end which receives the second bag 41 and an annular shoulder 42 is formed at the juncture of the reduced portion.

The second rubber bag 41 has its edges flanged outwardly against said shoulder 42 and contacts the partition member 40. Obviously, by screwing the cap 35 the two flanged ends of the rubber bags may be tightly compressed against the annular shoulder 42 with the metal disc 40 between said flanged ends. It will be apparent that the assembled rubber bags 41 and 36 form a closed resilient cylinder, and the disc 40 constitutes a partition in such resilient cylinder. The partition plate 40 is provided with an aperture or port 43 which establishes communication between the two parts of the resilient cylinder. This port is adapted to be controlled by a ball valve 44 which may be held in proper position by a suitable strap 45 or the like. Any suitable fluid may be placed within the resilient cylinder formed by the two rubber bags. The check valve 43 will restrict the flow from one portion of the cylinder to the other and thus act as a check to the compression of the bag or cylinder.

The aforementioned cammed member 11 has an annular flange 46 which is adapted to rotate in a vertical plane rearward of the cylindrical fluid chamber just described. This annular flange 46 is adapted for engaging suitable plugs or abutments 47 located in the different fluid cylinders. Consequently, when the cammed member is shifted toward the right, the flange 46 will impart pressure to the plug 47 and compress the resilient cylinder. Thus a gradual and smooth movement will be imparted to the cammed member 11 and sudden shocks or a quick jerky movement will be avoided. The cammed member also carries a ball thrust bearing which consists of a stationary ring 48 and a relatively rotatable race ring 49 with thrust bearing balls 50 therebetween. As the cammed member is shifted to the right, the relatively rotatable race ring 49 is adapted for contacting the enlarged head of a lever 51 which is pivoted intermediate its ends to a lug 52 on the casing with its outer end extending into a socket 53 in the friction plate 16. It will of course be understood that the lever 51 may be duplicated as desired to provide three or more as may be necessary. It will be apparent that as the cammed member engages the lever 51, the friction plate 16 will be gradually forced against the friction element 15 and gradually increase the frictional resistance of the friction clutch element in connection with the flywheel 2.

Upon the aforementioned sleeve 24 there is slidably secured a sleeve 54 which supports a thrust bearing 55 similar to the thrust bearing on the cammed member. This thrust bearing 55 is also adapted to contact the enlarged head of the lever 51. The sleeve 54 may be manually shifted to the left for actuating the lever 51 for releasing the friction clutch as is obvious.

It will be appreciated that according to the construction herein set forth the shiftable member for applying the friction plate will be effectively controlled in its movements and sudden shocks resulting more or less from a jerky or quick movement will be avoided.

I am aware that many changes may be made and numerous details of construction may be varied through a wide range without departing from the principles of this invention, and I therefore, do not purpose limiting the patent granted hereon otherwise than necessitated by the prior art.

I claim as my invention:

1. In a clutch mechanism comprising a driving member, a driven member, friction clutch elements between said members, a cam device connected to one of said friction elements, a cammed device having a longitudinal shifting movement splined upon the driven member, cushioning means between said devices, and means actuated by said cammed device for increasing the frictional resistance of said friction elements.

2. In a friction clutch mechanism, a laterally shiftable friction plate, a lever, said lever having a plurality of notches, a leaf spring attached to said friction plate and adapted for engaging one of said notches and manually operable means for shifting said lever for laterally shifting said friction plate and causing said leaf spring to engage a different notch.

3. In a friction clutch mechanism, a shiftable friction plate, levers for shifting said plate, a slidable member for engaging said levers for actuating the same, a rotatable member for shifting said first mentioned member, and a fluid cushioning device between said members.

4. In a friction clutch mechanism, a plurality of friction elements, means for initially engaging said elements including a shiftable member, a lever actuated by said shiftable member, and a leaf spring between said lever and one of said friction elements.

5. In a clutch mechanism, a plurality of friction members, means for initially engaging said members, and means for increasing the pressure between said members comprising a camming device, a cammed device and fluid cushion means between said devices.

6. In a clutch mechanism, a driving shaft, a driven shaft coaxially mounted with respect to the driving shaft, a fly wheel on the driving shaft, a camming member mounted upon the driven shaft, a friction element carried by said camming member for engaging said fly wheel, a cammed member splined upon the driven shaft adapted to be shifted by said camming member, fluid cushion cylinders between said members and means actuated by the shifting of said cammed member for increasing the pressure of said friction element against said fly wheel.

7. In a clutch mechanism, friction elements, means for initially engaging said elements, means for increasing the friction between said elements comprising a pair of relatively rotatable and shiftable members having opposing abutments and flexible fluid pressure cylinders between said abutments.

8. In a clutch mechanism, friction elements, means for initially engaging said elements, means for gradually increasing the friction between said elements comprising a pair of relatively shiftable members having opposed abutments and yieldable cylindrical fluid pressure cylinders between said abutments.

KENNETH E. LYMAN.